I. A. WEAVER.
PLOW MOUNTING.
APPLICATION FILED MAY 5, 1913.
1,086,491.
Patented Feb. 10, 1914.
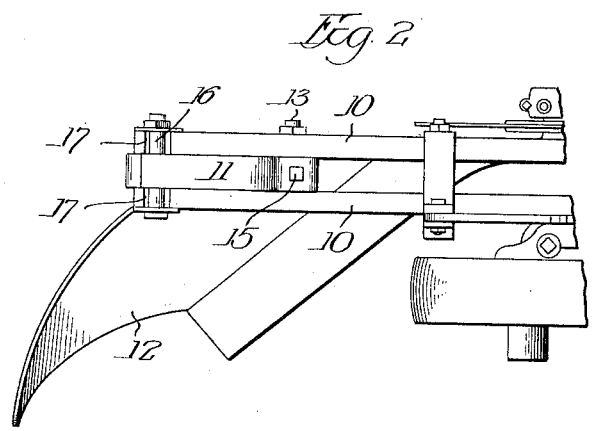
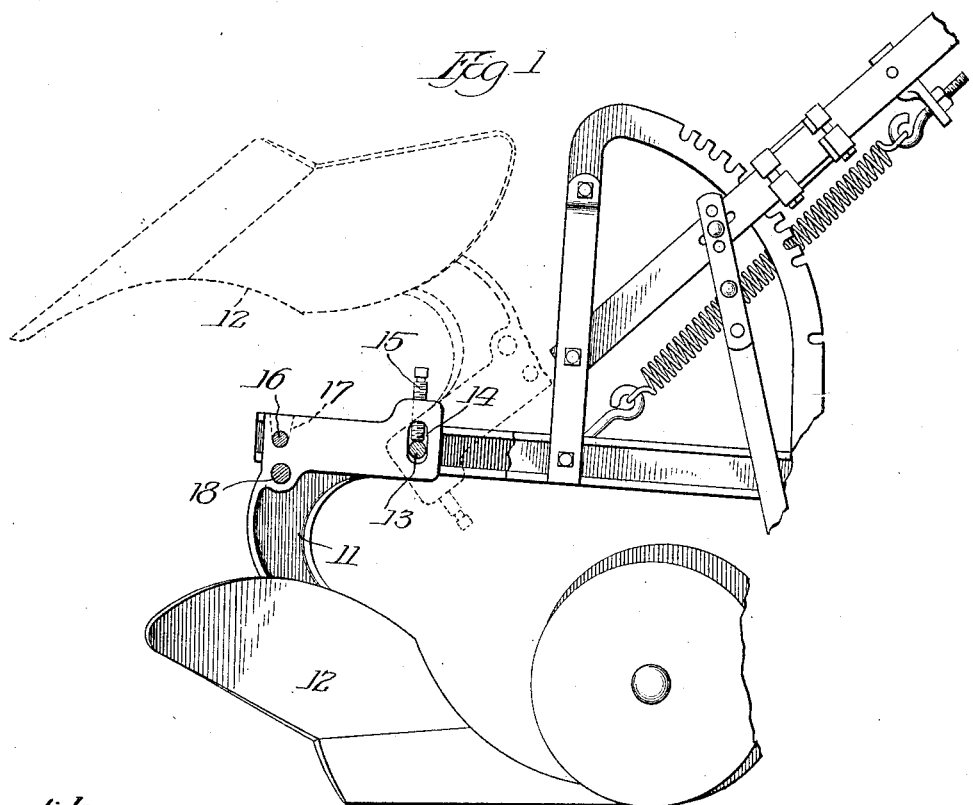

UNITED STATES PATENT OFFICE.

IRA A. WEAVER, OF SPRINGFIELD, ILLINOIS, ASSIGNOR TO THE RACINE-SATTLEY COMPANY, OF SPRINGFIELD, ILLINOIS, A CORPORATION OF ILLINOIS.

PLOW-MOUNTING.

1,086,491.  Specification of Letters Patent.  Patented Feb. 10, 1914.

Application filed May 5, 1913. Serial No. 765,432.

*To all whom it may concern:*

Be it known that I, IRA A. WEAVER, a citizen of the United States, and resident of Springfield, in the county of Sangamon and State of Illinois, have invented certain new and useful Improvements in Plow-Mountings, of which the following is a specification.

My invention relates to plows, and has particular reference to a novel mounting for a wheeled-plow.

In the employment of wheeled or gang plows, it is desirable that means should be included whereby the plow body may be freed from the plow-frame and allowed to rotate or become disengaged from the soil on the encountering of a solid obstruction which would otherwise tend to break the plow-point or other parts of the plow. It is also desirable that means should be included irrespective of the plow-lifting mechanism, whereby the plow-body may be completely raised out of possibility of engagement with the earth or out of possibility of engagement with obstructions in the transportation of the plow from one point to another. A plow having these features of construction is shown and described in my prior Patent No. 1,043,277, of November 5, 1912. In this patent the plow-standard is pivoted to the plow frame in such manner as to permit the elevation by rotation of the plow-body. However, in the employment of certain types of plow-body, particularly those having a long point, it has been found impossible to rotate the plow-body around the pivot pin for the reason that the point will contact the earth, the pivotal point being located considerably to the rear of the plow-point. Thus, the arc through which the plow-point must travel extends considerably lower than the normal elevation of the point. I have conceived, therefore, that the plow-standard should be pivoted to the frame at a point farther ahead on the frame, whereby the body may be lifted by rotation around such pivotal point without contact with the soil.

The invention will be more readily understood by reference to the accompanying drawings, wherein—

Figure 1 is a side elevation of a plow constructed in accordance with my invention, the plow-body being shown in dotted lines in elevated position, and Fig. 2 is a plan view of the portion of the construction shown in Fig. 1.

Referring more particularly to the drawings, it will be seen that I provide a pair of plow-beams 10 within which the standard 11 of a plow-body 12 is pivoted, by means of the bolt 13. This bolt is carried by the two plow-beams 10 and engages the plow standard through a slotted aperture 14. Threaded into the standard and entering the aperture is a set-bolt 15 by means of which the plow-body may be adjusted as to inclination, and, therefore, as to the degree in which it enters the soil. This construction provides a simple and easily accessible means for such adjustment. The pivot provides means for rotatably securing the plow-body to the frame of the plow. However, in order to secure the body in operative position I provide a bolt 16 passing through plow-standards 11 and resting in notches 17 in the beams 10. This bolt is provided with suitable washers and a tightening nut whereby the standard may be clamped between the beams. As a positive means for securing the body in engagement with the soil I provide a break pin 18 passing through an aperture in the plow-standard, its ends projecting beneath each of the beams 10. It will be seen that upon an excessive strain such as would be occasioned by the encountering of a rock by the plow point, this break pin will be broken, thus permitting the rotation of the plow-body and its disengagement from the obstruction and the soil.

In order to permit the rotation of the plow-beam in order to raise the point well above the surface of the ground in transportation, it becomes necessary only to remove the break pin 18 and slightly loosen the nut on the bolt 17 whereupon the plow-body and standard may be rotated to the dotted line position of Fig. 1.

It will be understood that in order to rotate the plow without contacting the ground with the plow point, the plow must be raised to the usual lifted or non-plowing position. In this position the plow body is considerably above the ground.

It is obvious that modifications may be made in the construction shown and such modifications as are within the scope of my claims I consider within the spirit of my invention.

I claim:

1. In a plow, the combination of a beam, a plow-standard having a plow body attached to the lower end thereof, the upper end of said standard being extended and bent into substantial parallelism with said beam, means for pivotally uniting said standard and beam at the extreme forward end of said standard, whereby said standard and plow-body may be swung upward without contact of the plow-point with the ground, and adjusting-means associated with said pivotal connection whereby the degree of penetration of said plow body may be controlled, substantially as described.

2. In a plow, the combination of a beam, a plow-standard having a forwardly-extended horizontal portion, means for adjustably pivoting the forward end of said standard to said beam, means disposed rearwardly of said pivotal point for supporting said standard on said beam but permitting said standard to be raised, substantially as described.

3. In a plow, the combination of a beam, a plow-standard having a forwardly-extended horizontal portion, means for adjustably pivoting the forward end of said standard to said beam, means disposed rearwardly of said pivotal point for supporting said standard on said beam but permitting said standard to be raised, and a break-pin also disposed rearwardly of said pivotal point and adapted to resist the upward movement of said standard, substantially as described.

In witness whereof I have hereunto signed my name in the presence of two witnesses.

IRA A. WEAVER.

Witnesses:
JOHN F. MCLENNAN,
M. J. GORTON.